United States Patent
Gotou

(10) Patent No.: US 10,603,790 B2
(45) Date of Patent: Mar. 31, 2020

(54) WORKPIECE PICKING DEVICE AND WORKPIECE PICKING METHOD FOR IMPROVING PICKING OPERATION OF WORKPIECES

(71) Applicant: FANUC CORPORATION, Yamanashi (JP)

(72) Inventor: Takefumi Gotou, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 27 days.

(21) Appl. No.: 15/875,239

(22) Filed: Jan. 19, 2018

(65) Prior Publication Data

US 2018/0222046 A1 Aug. 9, 2018

(30) Foreign Application Priority Data

Feb. 6, 2017 (JP) .................. 2017-019468

(51) Int. Cl.
*B25J 9/16* (2006.01)
*G05B 19/402* (2006.01)
(Continued)

(52) U.S. Cl.
CPC ............. *B25J 9/163* (2013.01); *B25J 9/1612* (2013.01); *B25J 9/1697* (2013.01);
(Continued)

(58) Field of Classification Search
CPC ............. G05B 13/0265; G05B 19/402; G05B 2219/32334; G05B 2219/40528;
(Continued)

(56) References Cited

U.S. PATENT DOCUMENTS

2011/0098859 A1* 4/2011 Irie ................. B25J 9/1687
700/259
2011/0223001 A1 9/2011 Martinez et al.
(Continued)

FOREIGN PATENT DOCUMENTS

CN 101081512 A 12/2007
CN 102343590 A 2/2012
(Continued)

*Primary Examiner* — Robert T Nguyen

(74) *Attorney, Agent, or Firm* — Hauptman Ham, LLP

(57) ABSTRACT

A workpiece picking device includes a sensor measuring a plurality of workpieces randomly piled in a three-dimensional space; a robot folding the workpieces; a hand mounted to the robot and hold the workpieces; a holding position posture calculation unit calculating holding position posture data of a position and a posture to hold the workpieces by the robot based on an output of the sensor; a loading state improvement operation generation unit generating loading state improvement operation data of improving a loading state of the workpieces by the robot based on an output of the sensor; and a robot control unit controlling the robot and the hand. The robot control unit controls the robot and the hand based on an output of the holding position posture calculation unit and the loading state improvement operation generation unit to pick the workpieces or perform a loading state improvement operation.

13 Claims, 12 Drawing Sheets

(51) Int. Cl.
*G06N 20/00* (2019.01)
*G06N 3/00* (2006.01)
*G06N 3/08* (2006.01)
G05B 13/02 (2006.01)

(52) U.S. Cl.
CPC .......... *G05B 19/402* (2013.01); *G06N 3/008* (2013.01); *G06N 3/08* (2013.01); G05B 13/0265 (2013.01); G05B 2219/32334 (2013.01); G05B 2219/39298 (2013.01); G05B 2219/40053 (2013.01); G05B 2219/40528 (2013.01); G05B 2219/40594 (2013.01); G06N 20/00 (2019.01); Y10S 901/02 (2013.01); Y10S 901/47 (2013.01)

(58) Field of Classification Search
CPC .......... G06N 3/008; G06N 3/08; G06N 20/00; Y10S 901/02; Y10S 901/47
See application file for complete search history.

(56) References Cited

U.S. PATENT DOCUMENTS

| | | | | |
|---|---|---|---|---|
| 2012/0259462 | A1* | 10/2012 | Aoba | B25J 9/1697 700/245 |
| 2013/0182903 | A1* | 7/2013 | Nammoto | G06K 9/00664 382/103 |
| 2017/0028562 | A1* | 2/2017 | Yamazaki | B25J 9/1612 |
| 2018/0311824 | A1* | 11/2018 | Wada | B25J 9/1697 |
| 2019/0091869 | A1* | 3/2019 | Yamazaki | B25J 9/163 |
| 2019/0152054 | A1* | 5/2019 | Ishikawa | B25J 15/08 |
| 2019/0295244 | A1* | 9/2019 | Adachi | G06T 7/0004 |

FOREIGN PATENT DOCUMENTS

| | | |
|---|---|---|
| CN | 103786153 A | 5/2014 |
| DE | 102012024328 B4 | 2/2014 |
| DE | 112012002677 T5 | 4/2014 |
| EP | 1589483 B1 | 12/2009 |
| JP | H8-305433 A | 11/1996 |
| JP | 2000-263480 A | 9/2000 |
| JP | 2001-179669 A | 7/2001 |
| JP | 2011-115930 A | 6/2011 |
| JP | 2012-135820 A | 7/2012 |
| JP | 2012-183616 A | 9/2012 |
| JP | 2013-052490 A | 3/2013 |
| JP | 2014-138964 A | 7/2014 |
| JP | 2015-30044 A | 2/2015 |
| JP | 2016-59983 A | 4/2016 |
| JP | 2016-132086 A | 7/2016 |
| JP | 2017-30135 A | 2/2017 |

\* cited by examiner

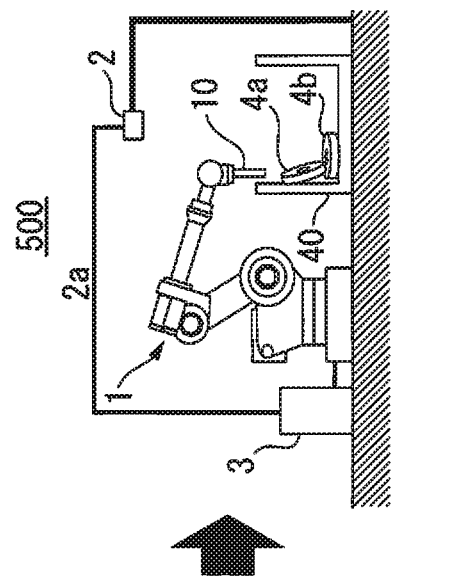
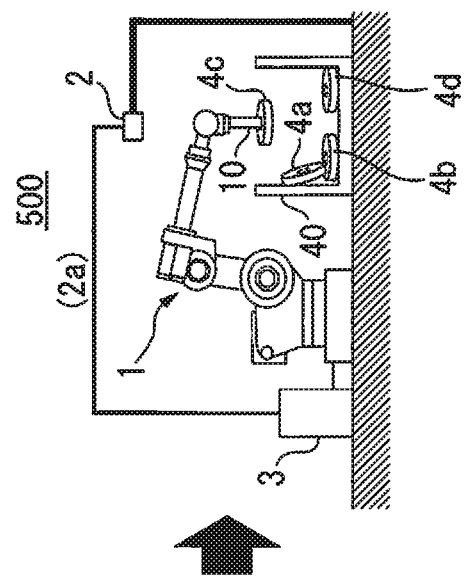
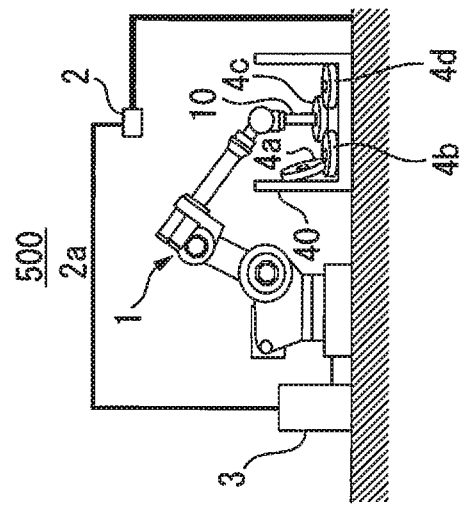

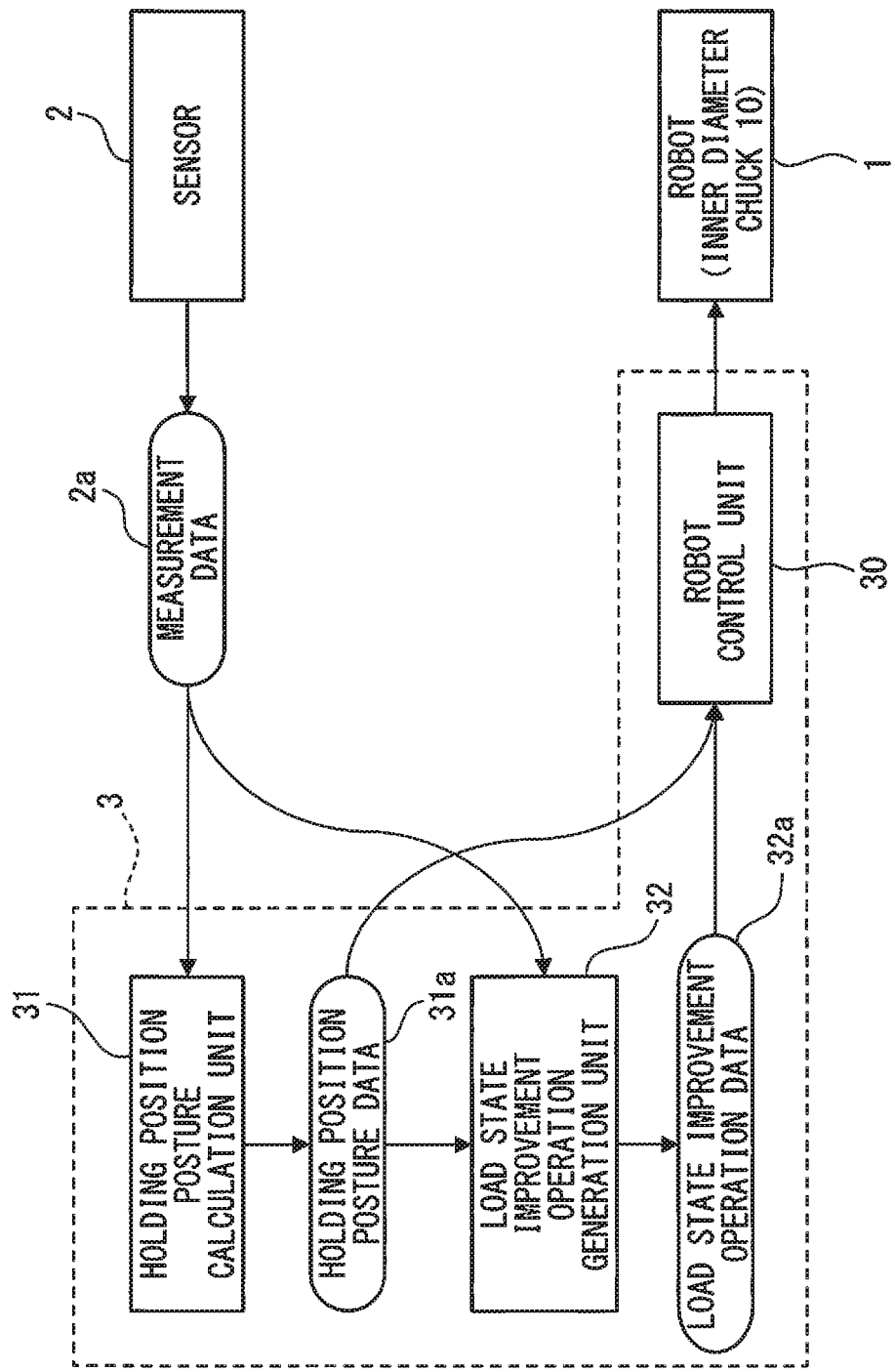

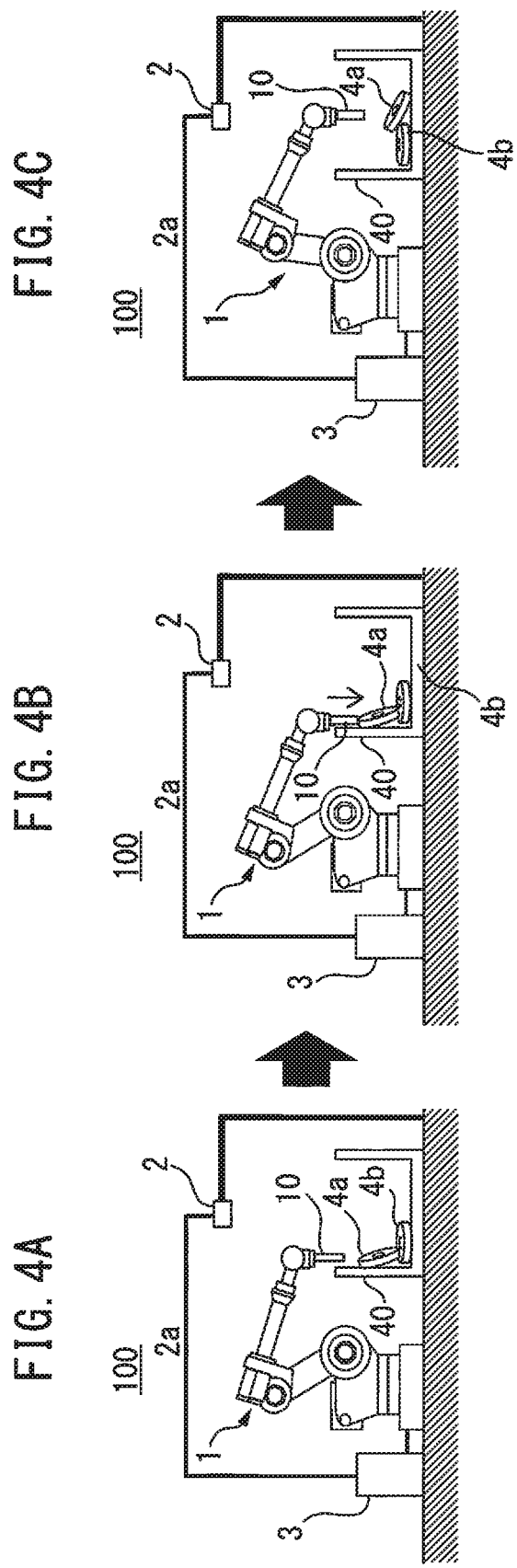

WORKPIECE PICKING DEVICE AND WORKPIECE PICKING METHOD FOR IMPROVING PICKING OPERATION OF WORKPIECES

RELATED APPLICATIONS

The present application claims priority to Japanese Patent Application No. 2017-019468 filed on Feb. 6, 2017, the disclosure of which is hereby incorporated by reference herein in its entirety.

BACKGROUND OF THE INVENTION

1. Field of the Invention

The present invention relates to a workpiece picking device and a workpiece picking method for improving a picking operation of workpieces.

2. Description of the Related Art

Conventionally, for example, a device which picks items randomly piled in a storage, such as a container (workpieces randomly piled in a three-dimensional space) by a robot has been used in various fields. In such a workpiece picking device, for example, an operation stable until the last workpiece is picked is difficult in general.

For example, this is because while, to pick workpieces (items), an operation of approaching a hand of a robot to the workpieces (approach operation) is performed, an interference of the hand with the storage or other workpieces occurs and, as a result, a state in which the workpieces to be picked fail to be held occurs. Further, for example, when picking processing is performed while workpieces are held in a prescribed holding manner, a case in which such a prescribed holding manner fails to be realized with respect to the workpieces having a three-dimensionally optional posture also frequently occurs. Specifically, when only one manner of holding workpieces is prescribed, if a surface desired to be held faces downward, holding the workpieces in the prescribed holding manner becomes difficult.

Thus, in the workpiece picking device (random pile picking system), a case in which although workpieces remain in the storage, the workpieces may be no longer picked often occurs.

Incidentally, hitherto, for example, Japanese Laid-Open Patent Publication No. 2013-052490 discloses a workpiece picking device in which a failure of picking from a multitude of workpieces is reduced and a retry operation is also reduced, the workpiece picking device being designed to estimate ease of holding a part of workpieces measured by a sensor on the basis of information on success or failure in picking in the past stored in a database and not hold preferentially workpieces which seem to be difficult to be held, but adjust at least one of an opening/closing amount, an operation speed, and a holding force of a hand to perform a more careful picking operation when there are no other workpieces which seem to be capable of being held.

Further, hitherto, for example, Japanese Laid-Open Patent Publication No. 2016-132086 discloses a workpiece feeding technique for improving a probability of holding workpieces randomly piled and improving a success rate of an operation in a subsequent step, the workpiece feeding technique comparing measurement data in which workpieces randomly piled are measured with shape data of workpieces stored in advance to calculate a position and a posture of the workpieces, selecting workpieces to be held on the basis of the position of the workpieces as calculated, and associating a position and a posture of the workpieces as selected with a plurality of holding postures indicating a positional relationship between the workpieces and a holding mechanism as calculated in such a manner as to be capable of feeding the workpieces to a feeding target to determine a holding posture of the workpieces.

Further, hitherto, for example, Japanese Laid-Open Patent Publication No. 2012-183616 discloses a workpiece feeding technique for picking for reliably changing a position and a posture of workpieces randomly piled and generating a new random pile state in which a projection portion is provided in a manner movable forward and backward from a bottom portion to an upward inner side of a container body which is open upward in which a plurality of workpieces may be randomly piled, and the projection portion is operated in a manner movable forward and backward to pick the workpieces one by one by a robot hand mounted to a robot.

However, in the workpiece picking device as described above, for example, when a part of other workpieces is superposed on a workpiece to be picked, it is difficult to improve such a situation to pick the workpiece, and thus effects are limited. In addition, for example, to perform association with a plurality of holding postures, necessity to prepare candidates of a large number of holding postures arises, which is thus unrealistic. Further, for example, to operate the projection portion of the container body in a manner movable forward and backward, an exclusive hardware mechanism for allowing such an operation to be performed is to be provided, and if the workpieces are heavy items, there occurs also a case in which it is difficult to operate the projection portion in a manner movable forward and backward.

Thus, hitherto, various workpiece picking devices have been proposed, whereas there has been a problem that it is difficult to pick workpieces randomly piled in a satisfactory manner or an exclusive hardware mechanism is to be provided.

It is an object of the present invention is to aim to provide a workpiece picking device and a workpiece picking method which may reduce the number of workpieces difficult to be picked.

SUMMARY OF INVENTION

According to a first aspect of the present invention, there is provided a workpiece picking device including a sensor which measures a plurality of workpieces randomly piled in a three-dimensional space; a robot which holds the workpieces; a hand mounted to the robot, the hand being capable of holding the workpieces; a holding position posture calculation unit which calculates holding position posture data of a position and a posture to hold the workpieces by the robot on the basis of an output of the sensor; a loading state improvement operation generation unit which generates loading state improvement operation data of an operation of improving a loading state of the workpieces by the robot on the basis of an output of the sensor; and a robot control unit which controls the robot and the hand, wherein the robot control unit controls the robot and the hand on the basis of an output of the holding position posture calculation unit and the loading state improvement operation generation unit to pick the workpieces or perform a loading state improvement operation.

According to a second aspect of the present invention, there is provided a workpiece picking method of a workpiece picking device, the workpiece picking device including a sensor which measures a plurality of workpieces randomly piled in a three-dimensional space, a robot which holds the workpieces, and a hand mounted to the robot, the hand being capable of holding the workpieces, the workpiece picking method including calculating holding position posture data of a position and a posture to hold the workpieces by the robot on the basis of an output of the sensor; generating loading state improvement operation data of an operation of improving a loading state of the workpieces by the robot on the basis of an output of the sensor; and controlling the robot and the hand on the basis of the holding position posture data and the loading state improvement operation data to pick the workpieces or perform a loading state improvement operation.

BRIEF DESCRIPTION OF THE DRAWINGS

The present invention will be understood more clearly by referring to the following accompanying drawings.

FIG. 2A, FIG. 2B, and FIG. 2C are diagrams for illustrating an example of an operation of the workpiece picking device as illustrated in FIG. 1;

FIG. 3 is a block diagram schematically illustrating a workpiece picking device according to a first embodiment;

FIG. 4 A, FIG. 4B, and FIG. 4C are diagrams for illustrating an example of an operation of the workpiece picking device as illustrated in FIG. 3;

DETAILED DESCRIPTION

Figure 1:
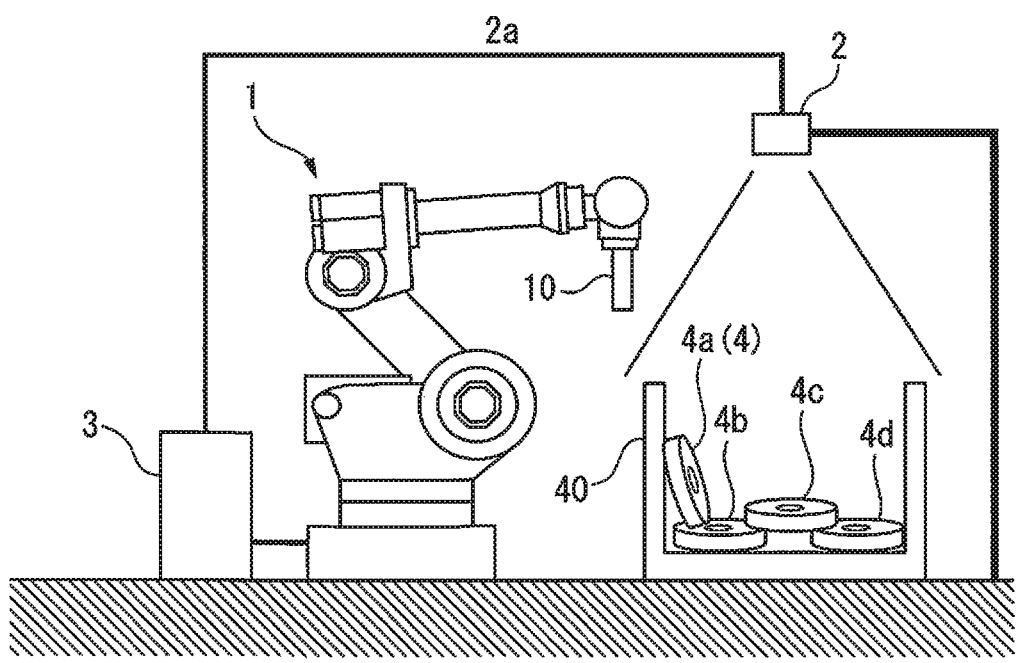
FIG. 1 is a diagram schematically illustrating an example of a workpiece picking device.

First, before embodiments of a workpiece picking device and a workpiece picking method are described in detail, an example of a workpiece picking device and a problem thereof will be described with reference to FIG. 1 and FIG. 2A to FIG. 2C. FIG. 1 is a diagram schematically illustrating an example of the workpiece picking device. As illustrated in FIG. 1, a workpiece picking device 500 is to pick in order a plurality of workpieces (items) 4a to 4d randomly piled in a storage, such as a container 40 and includes a robot 1, sensor 2, and a robot controller 3. Note that the workpieces 4a to 4d are not limited to those stored in the container 40 but it is needless to say that the workpieces 4a to 4d may be, for example, those randomly piled in a three-dimensional space.

Sideward of the robot 1, the box-shaped container 40 having an upper surface opened is disposed. In the container 40, the upper surface is opened, and in a storage space in the container 40, the plurality of workpieces (plurality of workpieces provided in disorder including a random pile state) 4a to 4d (4) randomly piled are stored. Note that the workpieces 4 may be held by a hand 10 mounted to the robot 1 and the workpieces 4 (4a to 4d) are designed to be picked one by one from the container 40 through an operation of the robot 1 and the hand 10 which are controlled by the robot controller 3.

Further, above a center portion of the container 40, the sensor 2 is provided, and an output (measurement data) 2a of the sensor 2 is inputted to the robot controller 3.

In FIG. 1, for the sake of simplification of illustration, an example in which a hole of a center portion of each of the workpieces 4 is held by the hand (inner diameter chuck) 10 while the four workpieces 4a to 4d (4) having a disk shape are randomly piled in the container 40 is illustrated, but a shape of the workpieces 4 is not limited to a disk shape and a holding mechanism of the workpieces 4 is also not to be limited to the inner diameter chuck. In other words, the hand 10 may also have various forms capable of holding the workpieces 4 and, for example, may have a form of holding the workpieces 4 by opening and closing two or a plurality of claw portions or may be also provided with an electromagnet or a negative pressure generation device which generates a suction force relative to the workpieces 4.

Further, the sensor 2 is a three-dimensional visual sensor which obtains information on a three-dimensional position and posture of each of the workpieces 4a to 4d and, may be that employing, for example, a stereo method using two cameras, a method of scanning laser slit light, a method of scanning laser spot light, a method of projecting pattern light onto items using a device, such as a projector, a method of utilizing a time in which light is emitted from an optical projector, is reflected on a surface of the workpieces 4, and enters an optical receiver, and the like. In addition, when, on the basis of the output (2a) of the sensor 2, a three-dimensional position and posture of the plurality of workpieces 4a to 4d randomly piled, a three-dimensional shape of the container 40, and the like are measured, for example, a triangulation measurement method, a light section method, a time-of-flight method, a depth from defocus method, or a method of using the same in combination may be employed.

Note that in FIG. 1, it is designed that the output (measurement data) 2a of the sensor (visual sensor) 2 is inputted to the robot controller 3 and the robot controller 3 performs image processing and the like, but it may be also configured that the output 2a of the sensor 2 is processed by an exclusive image processing device or the like provided separately from the robot controller 3 and an output of the image processing device is inputted to the robot controller 3. Further, the sensor 2 is provided to be fixed above the center portion of the container 40 but may be also provided as a hand eye mounted to a finger (tip end portion) of the robot 1.

Thus, in the workpiece picking device 500 as illustrated in FIG. 1, the robot controller 3 is designed to calculate holding position posture data of a position and a posture to hold the workpieces 4 by the inner diameter chuck 10 of the robot 1 on the basis of the output 2a of the sensor 2 which measures a three-dimensional position and posture of the plurality of workpieces 4a to 4d (4) randomly piled, a three-dimensional shape of the container 40, and the like and controls the robot 1 and the inner diameter chuck 10 to pick the workpieces 4 one by one.

FIG. 2A, FIG. 2B, and FIG. 2C are diagrams for illustrating an example of an operation of the workpiece picking device as illustrated in FIG. 1. FIG. 2A illustrates a state in which in the four workpieces 4a to 4d stored in the container 40 as illustrated in FIG. 1, to the center portion (hole position) of one workpiece 4c, the inner diameter chuck (hand) 10 of the robot 1 is moved, and the inner diameter chuck 10 is opened to hold the workpiece 4c. In addition, FIG. 2B illustrates a state in which the workpiece 4c held in FIG. 2A is lifted up to perform a picking operation. Further, FIG. 2C illustrates a state in which in the four workpieces 4a to 4d stored in the container 40, picking processing of the two workpieces 4c and 4d is terminated.

As described above, the workpiece picking device 500 calculates the holding position posture data of a position and a posture to hold the workpieces 4 by the inner diameter chuck 10 of the robot 1 on the basis of the output 2a of the sensor 2 and controls the robot 1 and the inner diameter chuck 10 to pick the workpieces 4 one by one. However, for example, as illustrated in FIG. 2C, while the workpiece 4a is on the workpiece 4b and, at the same time, when the workpiece 4a stands at a corner of the container 40 (the workpiece 4a leans against a wall surface of the container 40 at an acute angle), picking both the workpieces 4a and 4b becomes difficult.

Specifically, with respect to the workpiece 4b, for example, the workpiece 4a is on the workpiece 4b so that moving the inner diameter chuck 10 of the robot 1 to the center portion of the workpiece 4b to be inserted into the hole is difficult. Further, with respect to the workpiece 4a, for example, when the inner diameter chuck 10 of the robot 1 is attempted to be inserted into the center portion of the workpiece 4a which leans against the wall surface of the container 40 at an acute angle, a part of the robot 1 interferes with a wall of the container 40 or it is difficult to insert the inner diameter chuck 10 at an appropriate angle. Accordingly, for example, the robot controller 3 consequently fails to calculate the holding position posture data to hold the workpiece 4a or 4b by the inner diameter chuck 10 of the robot 1. Thus, when, although the workpieces 4a and 4b remain in the container 40, the workpieces 4a and 4b fail to be picked, there occurs reduction in productivity and the like.

Hereinafter, embodiments of a workpiece picking device and a workpiece picking method of the present invention will be described in detail with reference to the accompanying drawings. FIG. 3 is a block diagram illustrating a workpiece picking device 100 according to a first embodiment and schematically illustrates a configuration of the robot controller 3. Further, FIG. 4 A, FIG. 4B, and FIG. 4C are diagrams for illustrating an example of an operation of the workpiece picking device as illustrated in FIG. 3: FIG. 4A illustrates an approach position at which the robot 1 (hand 10) approaches the workpiece (4a); FIG. 4B illustrates a loading state improvement operation start position at which the robot 1 starts an operation of improving a loading state of the workpieces (4a and 4b); and FIG. 4C illustrates a loading state improvement operation termination position at which the robot 1 terminates the operation of improving the loading state of the workpieces (4a and 4b). Note that FIG. 4A corresponds to a state in which the holding position posture data to hold the workpiece 4a or 4b fails to be calculated as illustrated in FIG. 2C as described above.

In other words, as apparent from comparison between FIG. 4A to FIG. 4C and FIG. 1 and FIG. 2A to FIG. 2C as described above, the workpiece picking device 100 according to the first embodiment is similar in appearance to the workpiece picking device 500 as described above but differs in function (configuration) of the robot controller 3, i.e., function of a loading state improvement operation performed when none of the workpieces can be held by the robot 1 (hand (inner diameter chuck) 10 of the robot 1).

As illustrated in FIG. 3, in the workpiece picking device 100 according to the first embodiment, the robot controller 3 includes a robot control unit 30, a holding position posture calculation unit 31, and a loading state improvement operation generation unit 32. The holding position posture calculation unit 31 calculates the holding position posture data 31a of a position and a posture to hold the workpieces 4 (4a to 4d) by the inner diameter chuck 10 of the robot 1 on the basis of the output (measurement data) 2a of the sensor 2. The loading state improvement operation generation unit 32 generates loading state improvement operation data 32a of an operation of improving a loading state of the workpieces 4 by the inner diameter chuck 10 of the robot 1 on the basis of the output (measurement data) 2a of the sensor 2. Note that the robot control unit 30 controls the robot 1 and the inner diameter chuck 10 on the basis of the output 2a of the holding position posture calculation unit 31 and the loading state improvement operation generation unit 32.

In other words, when the workpieces 4 which may be held by the robot 1 ((inner diameter chuck) 10 of the robot 1) are present, for example, when the workpiece 4c in the four workpieces 4a to 4d as illustrated in FIG. 1 is present, the holding position posture calculation unit 31 calculates the holding position posture data 31a for holding the workpiece 4c on the basis of the output 2a of the sensor 2, outputs the same to the robot control unit 30, and controls the inner diameter chuck 10 (robot 1) of the robot 1 to perform picking processing of the workpiece 4c. Note that the picking processing of the workpiece 4c is similar to that described with reference to FIG. 2A and FIG. 2B.

On the other hand, when none of the workpieces 4 which may be held by the inner diameter chuck 10 of the robot 1 are present, for example, as illustrated in FIG. 2C, when the holding position posture data for holding the two remaining workpiece 4a or 4b fails to be calculated, the loading state improvement operation generation unit 32 generates the loading state improvement operation data 32a for improving a loading state of the workpieces 4 (4a and 4b) on the basis of the output 2a of the sensor 2 and the output of the holding position posture calculation unit 31, outputs the same to the robot control unit 30, and controls the inner diameter chuck 10 (robot 1) of the robot 1 to improve the loading state of the workpieces 4a and 4b.

The loading state improvement operation data 32a generated by the loading state improvement operation generation unit 32 includes, for example, data of the approach position at which the robot 1 (inner diameter chuck 10 of the robot 1) approaches the workpiece 4a as illustrated in FIG. 4A, the loading state improvement operation start position at which the robot 1 starts an operation of improving a loading state of the workpieces 4a and 4b as illustrated in FIG. 4B, and the loading state improvement operation termination position at which the robot 1 terminates the operation of improving the loading state of the workpieces 4a and 4b as illustrated in FIG. 4C.

Further, the loading state improvement operation data 32a may also include, for example, data of a speed at which the robot 1 (inner diameter chuck 10 of the robot 1) moves from the approach position to the loading state improvement operation start position (first speed data) and data of a speed at which the robot 1 moves from the loading state improvement operation start position to the loading state improvement operation termination position (second speed data). Note that as a manner of course, such data are merely an example and the loading state improvement operation data 32*a* may also include further another data.

Thus, the inner diameter chuck 10 of the robot 1 is moved from the loading state improvement operation start position as illustrated in FIG. 4B to the loading state improvement operation termination position as illustrated in FIG. 4C, whereby, for example, the workpiece 4*a* which leans against the wall surface of the container 40 at an acute angle is pushed downward to fall down. As a result, for example, the holding position posture calculation unit 31 calculates the holding position posture data 31*a* relative to the workpiece 4*a* (as fallen down) after the loading state improvement operation is performed to move the inner diameter chuck 10 of the robot 1 to the center portion (hole position) of one workpiece 4*a* to be capable of being inserted into, which allows the workpiece 4*a* to be picked.

Although as the operation of improving a loading state, an operation of applying an external force to the workpieces 4 randomly piled by the hand (inner diameter chuck) 10 so as to move or fall down the workpieces 4, it is needless to say that as the loading state improvement operation, various operations, such as, to begin with, an operation of temporarily holding an optional workpiece 4 and then dropping (releasing) the same when the hand 10 is a suction hand or a magnet hand are possible. In addition, for example, while the loading state improvement operation is performed, a force applied to at least one of the robot 1 and the hand 10 is measured, and when a prescribed force or greater is applied to at least one of the robot 1 and the hand 10 during the loading state improvement operation, the loading state improvement operation is stopped (interrupted) to withdraw the robot 1, thereby enabling a system to operate more stably. Further, an impedance control is applied to the loading state improvement operation, whereby it is also possible to perform the loading state improvement operation applying an appropriate external force to the workpieces.

Note that it is needless to say that after the loading state improvement operation is performed, for example, when it is possible to calculate the holding position posture data 31*a* relative to not only the workpiece 4*a* but also the workpiece 4*b* is possible, the workpiece 4*b* may be picked. In addition, when although the loading state improvement operation is performed, the holding position posture data 31*a* relative to both the remaining workpieces 4*a* and 4*b* still fails to be calculated, the loading state improvement operation may be again performed on the basis of the further loading state improvement operation data 32*a* generated by the loading state improvement operation generation unit 32. Thus, the workpiece picking device 100 according to the first embodiment may reduce the number of workpieces difficult to be picked and enables improvement in productivity to be aimed.

In other words, according to the workpiece picking device 100 according to the first embodiment, for example, it is possible to overcome a state in which although the workpieces remain in the container, picking the workpieces is difficult and improve the number of workpieces which may be picked, and for example, the workpieces including the last one may be picked.

Further, according to the workpiece picking device according to the first embodiment, for example, it is possible to improve a loading state by the robot using the hand and continue the picking operation of the workpieces without providing an exclusive device, such as that for shaking the container. Note that when such a loading state improvement operation is aimed to be realized using a conventional teaching playback framework, flexible operations are to be all programed in advance, which requires high skills from the user and a large number of operation hours, whereas, according to the workpiece picking device of the present embodiment, the robot itself performs the loading state improvement operation during a system operation, which enables the user to easily start up a stable system. Such effects are to be not limited to the workpiece picking device according to the first embodiment but may be further greatly obtained through second and third embodiments in which machine learning as described below is employed.

Figure 5:
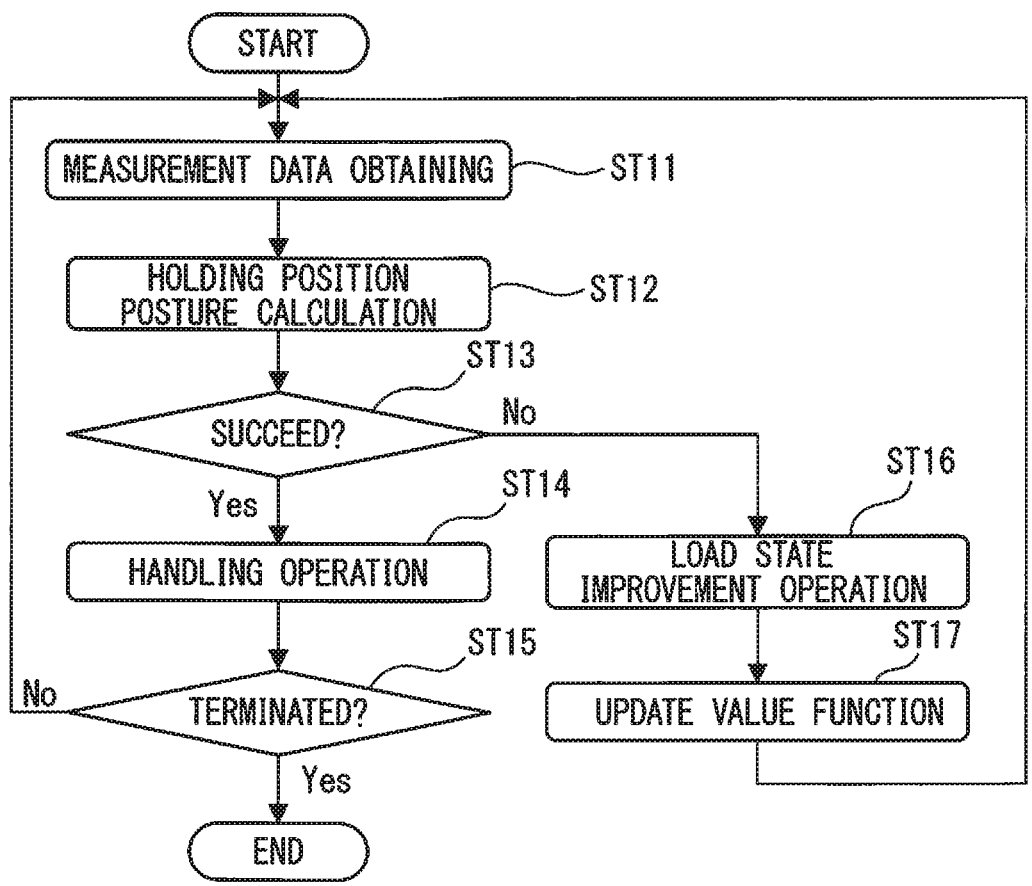
FIG. 5 is a flowchart for illustrating an example of workpiece picking processing of the workpiece picking device according to the first embodiment.

FIG. 5 is a flowchart for illustrating an example of workpiece picking processing of the workpiece picking device according to the first embodiment. As illustrated in FIG. 5, when an example of the workpiece picking processing of the workpiece picking device 100 according to the first embodiment starts, at step ST11, the measurement data 2*a* based on an output of the sensor 2 is obtained, the process advances to step ST12 and the holding position posture calculation unit 31 calculates a holding position posture (holding position posture data 31*a*), and the process advances to step ST13.

At step ST13, it is determined whether or not holding position posture calculation by the holding position posture calculation unit 31 succeeds, and when it is determined that calculation of the holding position posture data 31*a* succeeds (ST13: Yes), the process advances to step ST14 and a handling operation (holding and picking operation of the workpieces 4 by the inner diameter chuck 10 of the robot 1) is performed on the basis of the holding position posture data 31*a* as calculated, and the process advances to step ST15.

At step ST15, for example, it is determined whether or not picking of the plurality of workpieces 4*a* to 4*d* stored in the container 40 is completely terminated, and when it is determined that complete termination is made (ST15: Yes), workpiece picking processing is terminated, and when it is determined that complete termination is not made (ST15: No), the process returns to step ST11 and similar processing is repeated.

Further, at step ST13, when it is determined that holding position posture calculation fails (ST13: No), the process advances to step ST16 and the loading state improvement operation generation unit 32 generates the loading state improvement operation (loading state improvement operation data 32*a*), and the process advances to step ST17. At step ST17, a value function of the loading state improvement operation is updated, and the process returns to step ST11 and processing similar to that as described above is repeated. Generation processing of the loading state improvement operation data 32*a* at step ST16 and update processing of the value function at step ST17 may be performed, for example, by employing machine learning (deep learning, reinforcement learning).

Alternatively, as the generation processing of the loading state improvement operation data 32*a* at step ST16 and the update processing of the value function at step ST17, it is also possible that without employing machine learning, for example, the robot 1 and the hand (inner diameter chuck) 10 are controlled on the basis of the loading state improvement operation which is set in advance, thereby being capable of performing the loading state improvement operation of the workpieces 4. Then, it is needless to say that for example, as the loading state improvement operation, it is possible that the plurality of loading state improvement operation data 32*a* are set in advance, optimal loading state improvement operation data is selected using the holding position posture data 31a as calculated at step ST12, and on the basis of the loading state improvement operation data as selected, the loading state improvement operation may be performed.

Figure 6:
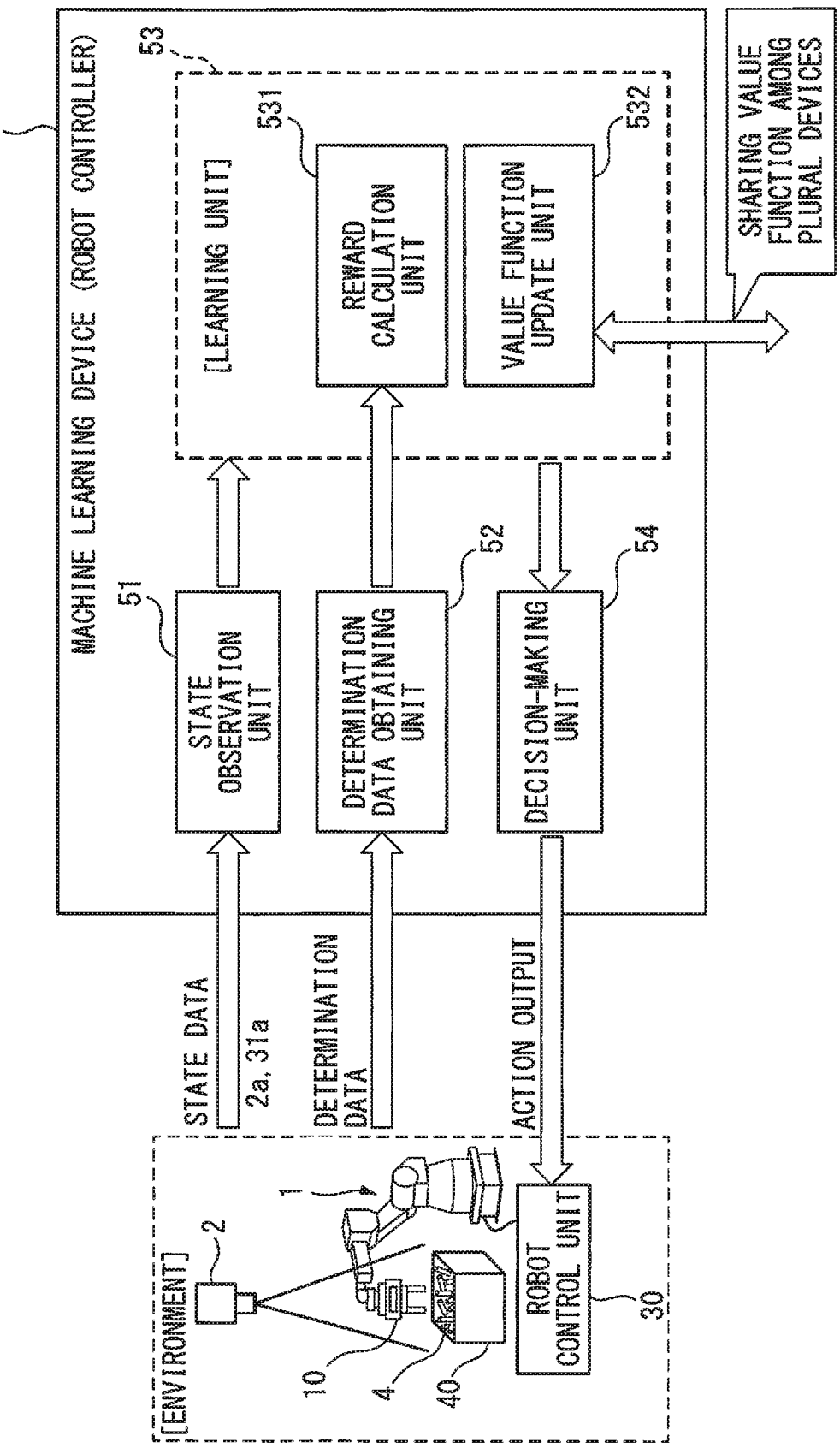
FIG. 6 is a block diagram illustrating a workpiece picking device according to a second embodiment.

FIG. 6 is a block diagram illustrating a workpiece picking device 200 according to the second embodiment and corresponds to that in which as the loading state improvement operation generation unit 32, a machine learning device 5 (second machine learning device) is employed. Note that in FIG. 6, although unillustrated, the holding position posture calculation unit 31 is provided, for example, to an environment including the robot 1, the sensor 2, and the like, and the holding position posture data 31a from the holding position posture calculation unit 31 is inputted as state data (state variable, state value) to the machine learning device 5. Further, for example, the machine learning device 5 may be also incorporated in the robot controller 3 (unillustrated) including the robot control unit 30 and the holding position posture calculation unit 31 but may be also provided as an exclusive device separately from the robot controller 3. Note that in FIG. 6, the workpieces 4 are illustrated to have a cylindrical shape and the hand 10 is illustrated to hold the workpieces 4 by opening and closing two claw portions, which, however, may be one of various types as described above.

As illustrated in FIG. 6, in the workpiece picking device 200 according to the second embodiment, the machine learning device 5 is, for example, to realize a function of the loading state improvement operation generation unit 32 in the workpiece picking device 100 according to the first embodiment as illustrated in FIG. 3 and includes a state observation unit (second state observation unit) 51, a determination data obtaining unit (second determination data obtaining unit) 52, a learning unit (second learning unit) 53, and a decision-making unit 54. The state observation unit 51 observes as state data the measurement data 2a which is an output of the sensor 2 and the holding position posture data 31a of each of the workpieces 4 based on an output of the holding position posture calculation unit (31).

The determination data obtaining unit 52 obtains as determination data whether or not a loading state changes before and after an operation of improving the loading state of the workpieces 4 based on the measurement data 2a and the holding position posture data 31a of each of the workpieces 4 after the operation of improving the loading state of the workpieces 4 is performed. The decision-making unit 54 refers to an output from the learning unit 53 and determines with respect to the robot 1 (hand 10) the operation of improving the loading state of the workpieces 4.

The learning unit 53 includes a reward calculation unit (second reward calculation unit) 531 and a value function update unit (second value function update unit) 532, receives an output from the state observation unit 51 and an output from the determination data obtaining unit 52, and learns the operation of improving the loading state of the workpieces 4. The reward calculation unit 531 calculates a reward on the basis of whether or not a loading state changes before and after an operation of improving the loading state of the workpieces 4 and the holding position posture data 31a of each of the workpieces 4 after the operation of improving the loading state of the workpieces 4 is performed which are the output from the determination data obtaining unit 52. Further, the value function update unit 532 has a value function for determining a value of the operation of improving the loading state of the workpieces 4 and updates the value function in accordance with the reward.

In other words, the reward calculation unit 531 sets a positive reward when the loading state changes and sets a negative reward when the loading state does not change before and after the operation of improving the loading state of the workpieces 4 (third reward setting). Further, the reward calculation unit 531 sets a positive reward when calculation of the holding position posture data 31a of each of the workpieces 4 succeeds and sets a negative reward when calculation of the holding position posture data 31a fails after the operation of improving the loading state of the workpieces 4 is performed (fourth reward setting). The reward calculation unit 531 may perform both of the third reward setting and the fourth reward setting, or may perform only one of these reward settings.

Thus, according to the workpiece picking device 200 according to the second embodiment, even when the workpieces 4 difficult to be held and picked (handling) by the hand 10 of the robot 1 remain, the machine learning device 5 is employed to be thus capable of updating an operation of improving a loading state of the workpieces 4 and enabling a state in which handling is possible. Thereby, the number of workpieces difficult to be picked may be reduced and improvement in productivity may be aimed.

The machine learning device 5 may be provided to the robot controller 3 (edge) which controls each robot 1, but may be also provided, for example, to each factory having the plurality of robots 1 (robot systems) (for example, in a fog server) or in a cloud server connected to a plurality of factories via a communication line, such as the Internet. Note that the machine learning device 5 provided to each robot may be also configured, for example, to be connectable to at least one other machine learning device (5) and to mutually exchange or share a result of machine learning with such at least one other machine learning device (5).

Incidentally, the machine learning device 5 has functions of analytically extracting, from a set of data as inputted into the device, a useful rule, a knowledge representation, a criterion for determination or the like contained therein, outputting a result of the determination, and performing knowledge learning (machine learning). Various techniques are available for the machine learning, which are broadly classified into, for example, "supervised learning", "unsupervised learning", and "reinforcement learning". In addition, there is a technique referred to as "deep learning" in which extraction of a feature value per se is learned in order to implement these techniques.

The machine learning device 5 as illustrated in FIG. 6 employs "reinforcement learning (Q-learning)". Although the machine learning device 5 may use a general-purpose computer or a processor, adoption of, for example, general-purpose computing on graphics processing units (GPGPU), large-scale PC clusters or the like allows higher processing. With respect to the whole of machine learning, an outline will be described.

First, in supervised learning, a large quantity of teacher data, i.e., data sets of certain inputs and results (labels) are provided to the machine learning device to learn features in the data sets and inductively obtain a model (error model) for estimating the result from the input, i.e., a relationship thereof. For example, supervised learning may be implemented using an algorithm, such as a neural network as described below.

Unsupervised learning is a technique in which a large quantity of input data alone are provided to the machine learning device to learn how the input data are distributed and the device that performs compression, classification, shaping or the like with respect to the input data performs learning without being provided with corresponding teacher output data. For example, features in the data sets may be clustered into similar features. Using this result, it is possible to achieve prediction of output by allocating outputs such that some criterion is defined to optimize the result.

As intermediate problem setting between unsupervised learning and supervised learning, there is one referred to as semi-supervised learning, which applies to a case, for example, in which there are only some data sets of inputs and outputs and the remaining data are only inputs.

Next, reinforcement learning will be described further in detail. First, a problem setting in reinforcement learning is considered as follows.

The workpiece picking device (i.e., the robot 1 and the robot controller (including the robot control unit 30 and the machine learning device 5) 3) 200 observes a state of the environment and decides an action.

The environment may change in accordance with some rule, and further, the robot system may change the environment by its own action.

A reward signal returns each time the action is taken.

It is the sum of (discounted) rewards in the future, which is desired to be maximized.

Learning starts in a state in which the result caused by the action is completely not known or only incompletely known. In other words, the robot control unit an obtain the result as data only after it actually takes an action. In short, it is preferable to explore the optimum action by trial and error.

By setting a state in which learning (a technique, such as supervised learning as described above or inverse reinforcement learning) is performed in advance to mimic a human behavior as the initial state, learning may be started from a good starting point.

Reinforcement learning is a technique in which, not only by determination or classification but also by learning actions, an appropriate action is learned in consideration of the interaction provided by an action to environment, i.e., how to maximize the reward obtained in the future is learned. Hereinafter, description is continued with an example of Q-learning, but the present invention is not limited to Q-learning.

Q-learning is a method for learning a value $Q(s, a)$ for selecting an action a in a certain environmental state s. In other words, in the certain state s, an action a with the highest value $Q(s, a)$ may be preferably selected as the optimum action. However, at first, the correct value for the value $Q(s, a)$ is completely not known for a pair of the state s and the action a. Accordingly, an agent (action subject) selects various actions a under the certain state s and is given a reward for the action a at that time. Consequently, the agent learns to select a better action, i.e., a correct value $Q(s, a)$.

Further, as a result of the action, it is desired to maximize the sum of the rewards obtained in the future, and it is aimed to finally satisfy $Q(s, a) = E[\Sigma \gamma^t r_t]$. The expected value is assumed to be taken for the case when the state changes following the optimum action, and since it is not known, it is learned by making exploration. An update formula for such value $Q(s, a)$ may be represented, for example, by equation (1) as follows:

$$Q(s_t, a_t) \leftarrow Q(s_t, a_t) + \alpha \left( r_{t+1} + \gamma \max_a Q(s_{t+1}, a) - Q(s_t, a_t) \right) \quad (1)$$

In the above equation (1), $s_t$ represents a state of the environment at a time t, and $a_t$ represents an action at the time t. The action $a_t$ changes the state to $s_{t+1}$. $r_{t+1}$ represents a reward that may be gained with the change of the state. Further, the term attached with max is the product of the Q-value multiplied by γ for the case where the action a with the highest Q-value known at that time is selected under the state $s_{t+1}$. γ is a parameter satisfying $0 < \gamma \leq 1$, and referred to as a discount rate. α is a learning factor, which is in the range of $0 < \gamma \leq 1$.

The above equation (1) represents a method for updating the evaluation value $Q(s_t, a_t)$ of the action $a_t$ in the state $s_t$ on the basis of the reward $r_{t+1}$ returned as a result of the action $a_t$. In other words, it is indicated that when sum of the reward $r_{t+1}$ and the evaluation value $Q(s_{t+1}, \max a_{t+1})$ of the best action max a in the state subsequent to the state s upon the action a is larger than the evaluation value $Q(s_t, a_t)$ of the action a in the state s, $Q(s_t, a_t)$ is increased; otherwise, $Q(s_t, a_t)$ is decreased. In other words, it is configured such that a value of a certain action in a certain state is made to be closer to the reward that is instantly returned as a result and the value of the best action in the subsequent state upon that action.

Methods of representing $Q(s, a)$ on a computer include a method in which values of all state-action pairs $(s, a)$ are held in the form of a table and a method in which a function approximating $Q(s, a)$ is provided. In the latter method, the above equation (1) may be implemented by adjusting parameters of the approximation function using a technique, such as a stochastic gradient descent method. As the approximation function, a neural network described later may be used.

Figure 7:
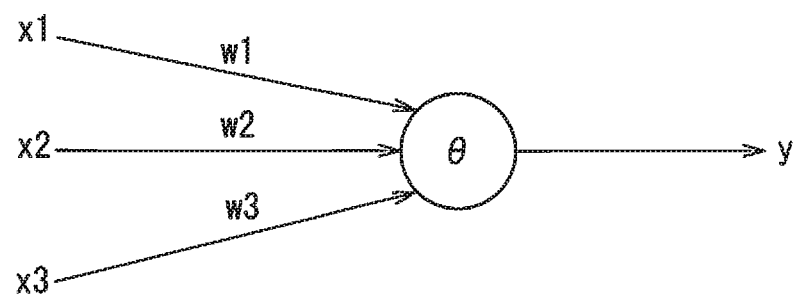
FIG. 7 is a diagram a diagram schematically illustrating a model for a neuron.
Figure 8:
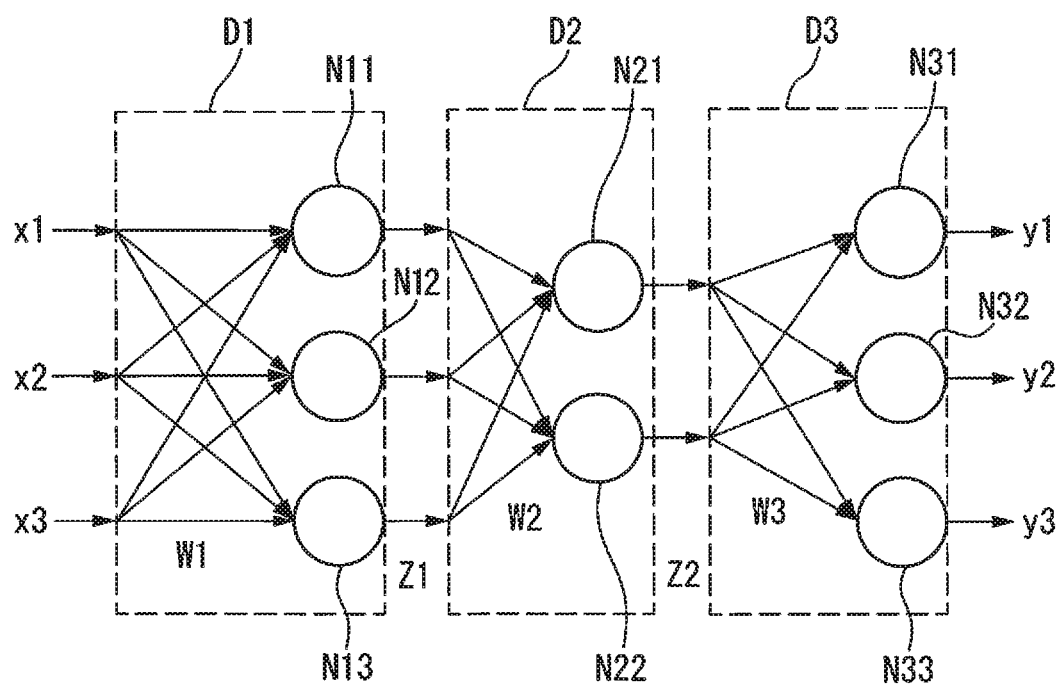
FIG. 8 is a diagram schematically illustrating a three-layer neural network formed by combining the neurons as illustrated in FIG. 7.

As an approximation algorithm for a value function in reinforcement learning, a neural network may also be used. FIG. 7 is a diagram schematically illustrating a model for a neuron, and FIG. 8 is a diagram schematically illustrating a three-layer neural network formed by combining neurons as illustrated in FIG. 7. In other words, the neural network is configured, for example, of an arithmetic device simulating a model for a neuron as illustrated in FIG. 7, a memory, and the like.

As illustrated in FIG. 7, the neuron outputs an output (result) y for a plurality of inputs x (in FIG. 7, by way of example, inputs x1 to x3). Each of the inputs x (x1, x2, x3) is multiplied by a weight w (w1, w2, w3) corresponding to the input x. Thereby, the neuron outputs the result y represented by the following equation (2). Note that all of the input x, the result y, and the weight w are vectors. In the equation (2) below, θ is a bias, and $f_k$ is an activation function.

$$y = f_k \left( \sum_{i=1}^{n} x_i w_i - \theta \right) \quad (2)$$

Referring to FIG. 8, a description will be given of a three-layer neural network formed by a combination of neurons as illustrated in FIG. 7. As illustrated in FIG. 8, a plurality of inputs x (by way of example herein, inputs x1 to input x3) are inputted from the left side of the neural network, and a result y (by way of example herein, result y1 to input y3) is outputted from the right side. Specifically, the inputs x1, x2, and x3 are multiplied by a weight corresponding to each of three neurons N11 to N13 and inputted. The weights used to multiply these inputs are collectively denoted by W1.

The neurons N11 to N13 output z11 to z13, respectively. In FIG. 8, z11 to z13 are collectively referred to as a feature vector Z1, which may be regarded as a vector which is obtained by extracting feature values of the input vector. The feature vector Z1 is a feature vector defined between the weight W1 and the weight W2. z11 to z13 are multiplied by a weight corresponding to each of the two neurons N21 and N22 and inputted. The weights used to multiply these feature vectors are collectively denoted by W2.

The neurons N21 and N22 output z21 and z22, respectively. In FIG. 8, z21, z22 are collectively referred to as a feature vector Z2. The feature vector Z2 is a feature vector defined between the weight W2 and the weight W3. z21 and z22 are multiplied by a weight corresponding to each of the three neurons N31 to N33 and inputted. The weights used to multiply these feature vectors are collectively denoted by W3.

Finally, the neurons N31 to N33 output result y1 to result y3, respectively. The operation of the neural network includes a learning mode and a value prediction mode. For example, in the learning mode, the weight W is learned using a learning data set, and in the prediction mode, the action of the robot control unit s determined using the parameters. Although reference is made to prediction for convenience, it is needless to say that various tasks, such as detection, classification, inference, and the like, are possible.

It is possible that the data obtained by actually operating the robot control unit in the prediction mode is immediately learned to be reflected on the subsequent action (on-line learning) and also that a group of pre-collected data is used to perform collective learning and a detection mode is executed with the parameter since then (batch learning). An intermediate case is also possible, where a learning mode is interposed each time data is accumulated to a certain degree.

The weights W1 to W3 may be learned by an error backpropagation method. The error information enters from the right side and flows to the left side. The error back propagation method is a technique for adjusting (leaning) each weight so as to reduce the difference between an output y when an input x is inputted and a true output y (teacher) for each neuron. Such a neural network may have three or more layers (referred to as deep learning). It is possible to extract features of the input step by step to automatically obtain an arithmetic device, which feeds back the results, from the teacher data alone.

As described with reference to FIG. 6, the machine learning device 5 according to the present example includes the state observation unit 51, the determination data obtaining unit 52, the learning unit 53, and the decision-making unit 54, for example, to perform Q-learning. Note that the machine learning method applied to the present invention is not limited to Q-learning, and as described above, the machine learning device 5 may be realized by adopting GPGPU, large-scale PC clusters or the like.

Figure 9:
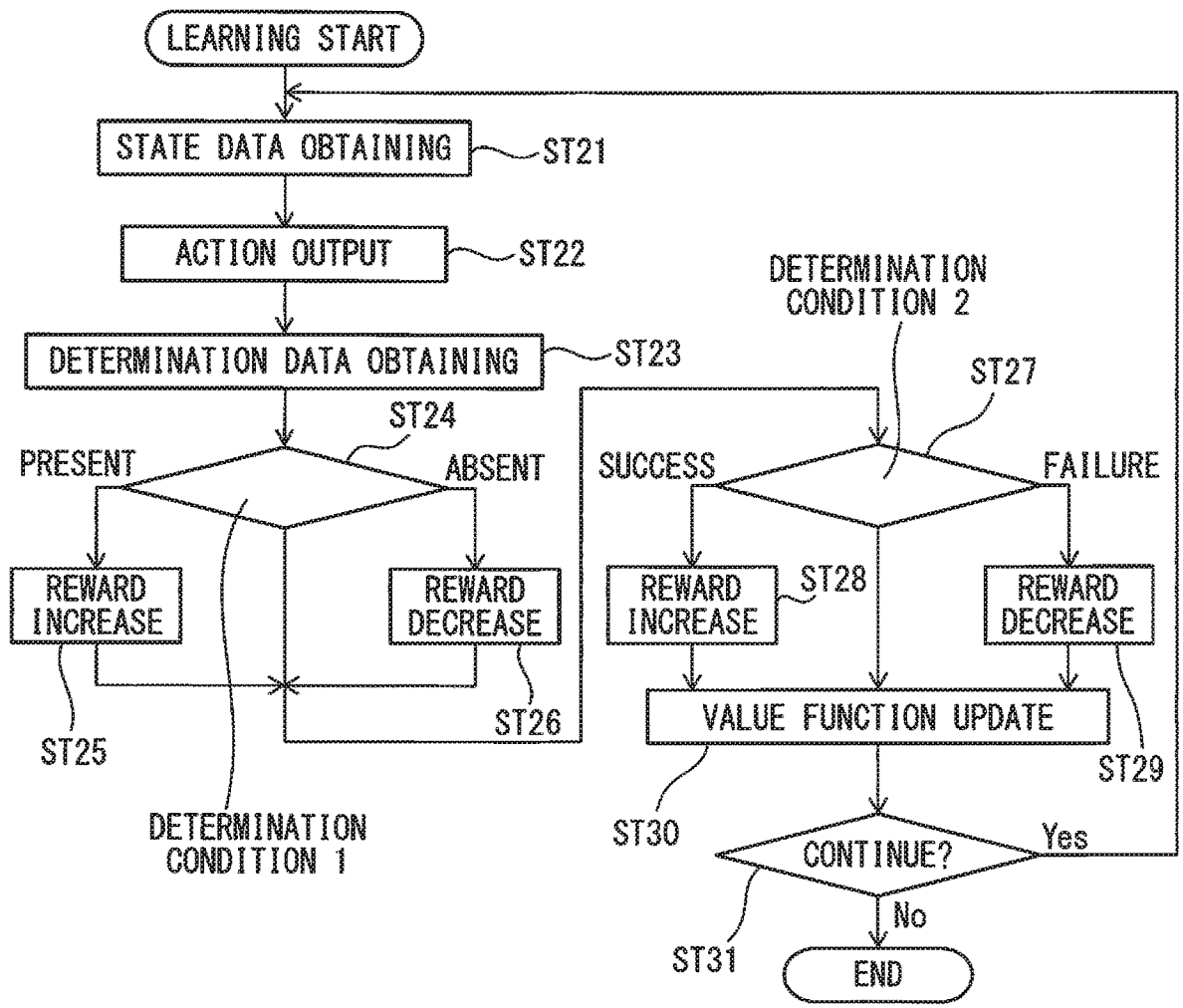
FIG. 9 is a flowchart for illustrating an example of workpiece picking processing of the workpiece picking device according to the second embodiment.

FIG. 9 is a flowchart for illustrating an example of workpiece picking processing of the workpiece picking device according to the second embodiment and is to illustrate an example of a loading state improvement operation (loading state improvement processing). As illustrated in FIG. 9, when an example of workpiece picking processing (loading state improvement processing) of the workpiece picking device 200 according to the second embodiment starts, at step ST21, the state data (measurement data 2a based on an output of the sensor 2) is obtained, the process advances to step ST22 and an action output is performed, and further the process advances to step ST23.

The action output at step ST22 corresponds to the loading state improvement operation data 32a generated by the loading state improvement operation generation unit 32 in FIG. 3 as described above and, for example, corresponds to performing an action based on data of the approach position at which the robot 1 approaches the workpiece 4 as illustrated in FIG. 4A, the loading state improvement operation start position at which the robot 1 starts an operation of improving a loading state of the workpieces 4 as illustrated in FIG. 4B, and the loading state improvement operation termination position at which the robot 1 terminates the operation of improving the loading state of the workpieces 4 as illustrated in FIG. 4C. Further, the action output at step ST22 may include, for example, data of a speed at which the robot 1 moves from the approach position to the loading state improvement operation start position (first speed data) and data of a speed at which the robot 1 moves from the loading state improvement operation start position to the loading state improvement operation termination position (second speed data).

At step ST23, the determination data based on the action output at step ST22 is obtained and determination according to a determination condition 1 of step ST24 and determination according to a determination condition 2 of step ST27 are performed. In other words, in the obtainment of the determination data at step ST23, for example, whether or not the loading state changes, which is obtained by comparing measurement data before the loading state improvement operation is performed and measurement data after the loading state improvement operation is performed (determination condition 1), and success or failure in calculation of a holding position posture using the measurement data after the loading state improvement operation is performed (determination condition 2) are obtained.

First, at step ST24, on the basis of the data of whether or not the loading state changes before and after the operation of improving the loading state of the workpieces 4 as obtained at step ST23, for example, when it is determined that the loading state changes before and after the operation of improving the loading state of the workpieces 4, the process advances to step ST25 and a positive reward is set, and when it is determined that the loading state does not change, the process advances to step ST26 and a negative reward is set.

Further, at step ST27, on the basis of the holding position posture of each of the workpieces 4 after the operation of improving the loading state of the workpieces 4 is performed (holding position posture data 31a) as obtained at step ST23, for example, when it is determined that calculation of the holding position posture data 31a of each of the workpieces 4 succeeds after the operation of improving the loading state of the workpieces 4 is performed, the process advances to step ST28 and a positive reward is set, and when it is determined that calculation of the holding position posture data 31a fails, the process advances to step ST29 and a negative reward is set.

Note that in the determination at step ST24, on the basis of not whether or not the loading state changes before and after the operation of improving the loading state of the workpieces 4 but a degree of change of the loading state, a reward may be also determined. Specifically, for example, it is also possible that a degree of change LV of the loading state is divided by two threshold values TH1, TH2 (however, TH1>TH2), and when the change LV of the loading state is greater than the threshold value TH1, a positive reward (LV>TH1: reward +5) is set, when the change LV of the loading state is between the threshold values TH1 and the TH2, a null value (TH1≥LV≥TH2: reward 0) is set, and when the change LV of the loading state is less than the threshold value TH2, a negative reward (TH2>LV: reward −5) is set. Further, with respect to the degree of change of the loading state, for example, when measurement data is a distance image, the number of pixels in which there is a change on the distance image may be also counted, or a change value of pixels may be also convoluted, a method of which is optional.

Further, it is also possible that a weight is configured to be different depending on determination according to the determination condition 1 at step ST24 or determination according to the determination condition 2 at step ST27. Specifically, for example, a positive reward at step ST28 when calculation of the holding position posture data 31a according to the determination condition 2 succeeds (e.g., +10) may be set to be greater than a positive reward at step ST25 when a loading state changes according to the determination condition 1 (e.g., +5). This is because even when a loading state changes according to the determination condition 1, if calculation of the holding position posture data 31a according to the determination condition 2 des not succeed, it is difficult to hold and pick the workpieces 4, and thus increasing a weigh of a determination result (reward) according to the determination condition 2 is favorable. Note that it is a matter of course that the determination condition is not limited to the determination condition 1 at step ST24 and the determination condition 2 at step ST27 but may also additionally include other conditions, or may be also either the determination condition 1 or the determination condition 2.

Next, the process advances to step ST30 and on the basis of the determination according to the determination condition 1 at step ST24 and the determination according to the determination condition 2 at step ST27, i.e., on the basis of a sum of rewards by steps ST25, ST26, ST28, and ST29, a value function which determines a value of the operation of improving the loading state of the workpieces 4 is updated, and the process advances to step ST31. At step ST31, whether or not to continue the loading state improvement processing is determined, and when it is determined to further continue the same (ST31: Yes), the process returns to step ST21 and the processing as described above is repeated, and when it is determined not to continue the same (ST31: No), the loading state improvement processing is terminated. Thus, the machine learning (reinforcement learning) is employed to perform the loading state improvement processing so that the number of workpieces difficult to be picked may be still further reduced.

Figure 10:
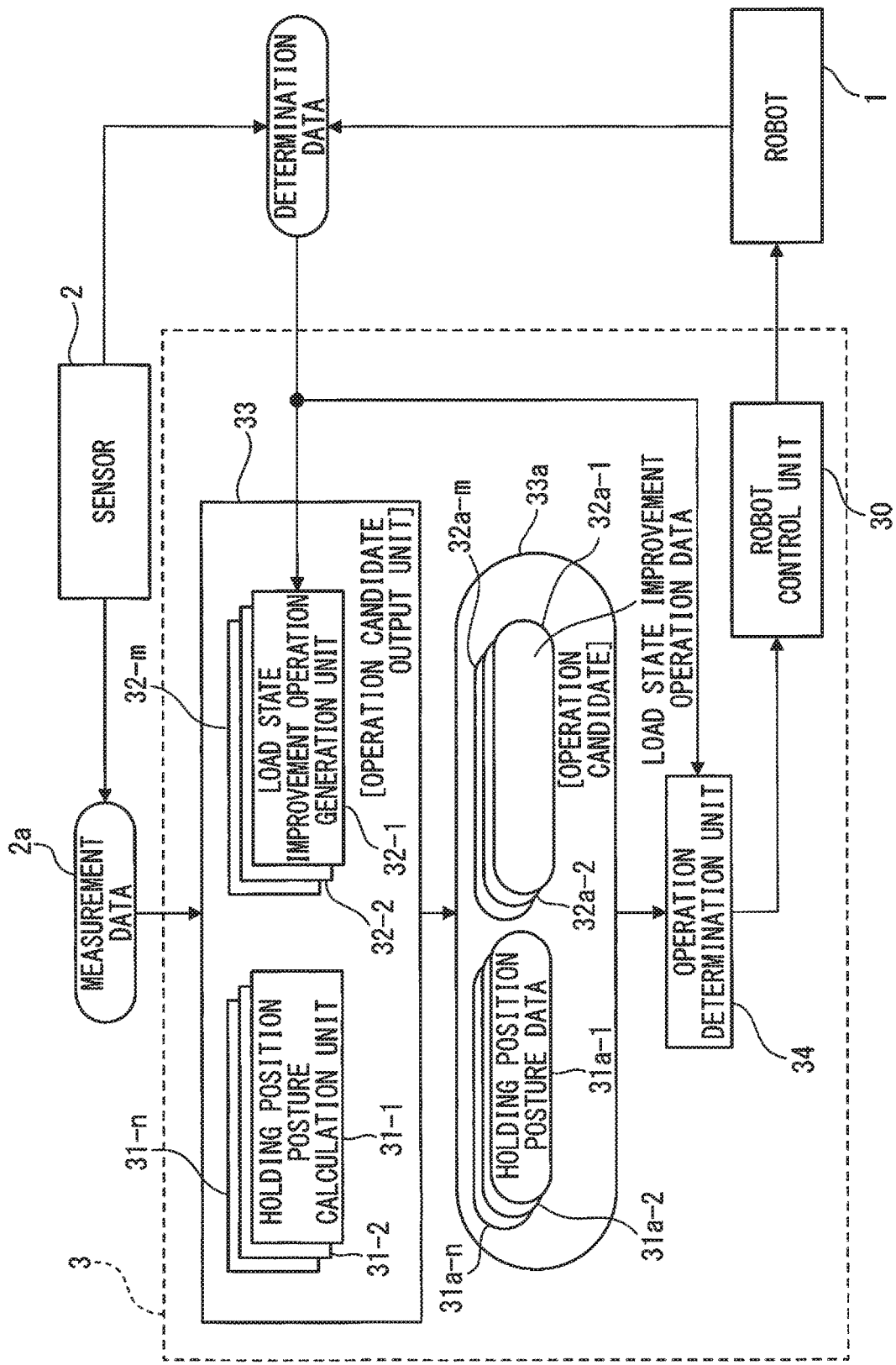
FIG. 10 is a block diagram illustrating a workpiece picking device according to a third embodiment.

FIG. 10 is a block diagram illustrating a workpiece picking device 300 according to the third embodiment and is to schematically illustrate a configuration of the robot controller 3. As apparent from comparison between FIG. 10 and FIG. 3 as described above, in the workpiece picking device 300 according to the third embodiment, the robot controller 3 includes a robot control unit 30, an operation candidate output unit 33 including at least one holding position posture calculation unit 31-1 to 31-n and at least one loading state improvement operation generation unit 32-1 to 32-m, and an operation determination unit 34.

The operation determination unit 34 controls the robot 1 through the robot control unit 30 on the basis of an output of the operation candidate output unit 33. The operation determination unit 34 includes a machine learning device 6 which learns an operation of improving a loading state of the workpieces (4) by the robot 1 by performing machine learning (reinforcement learning).

Figure 11:
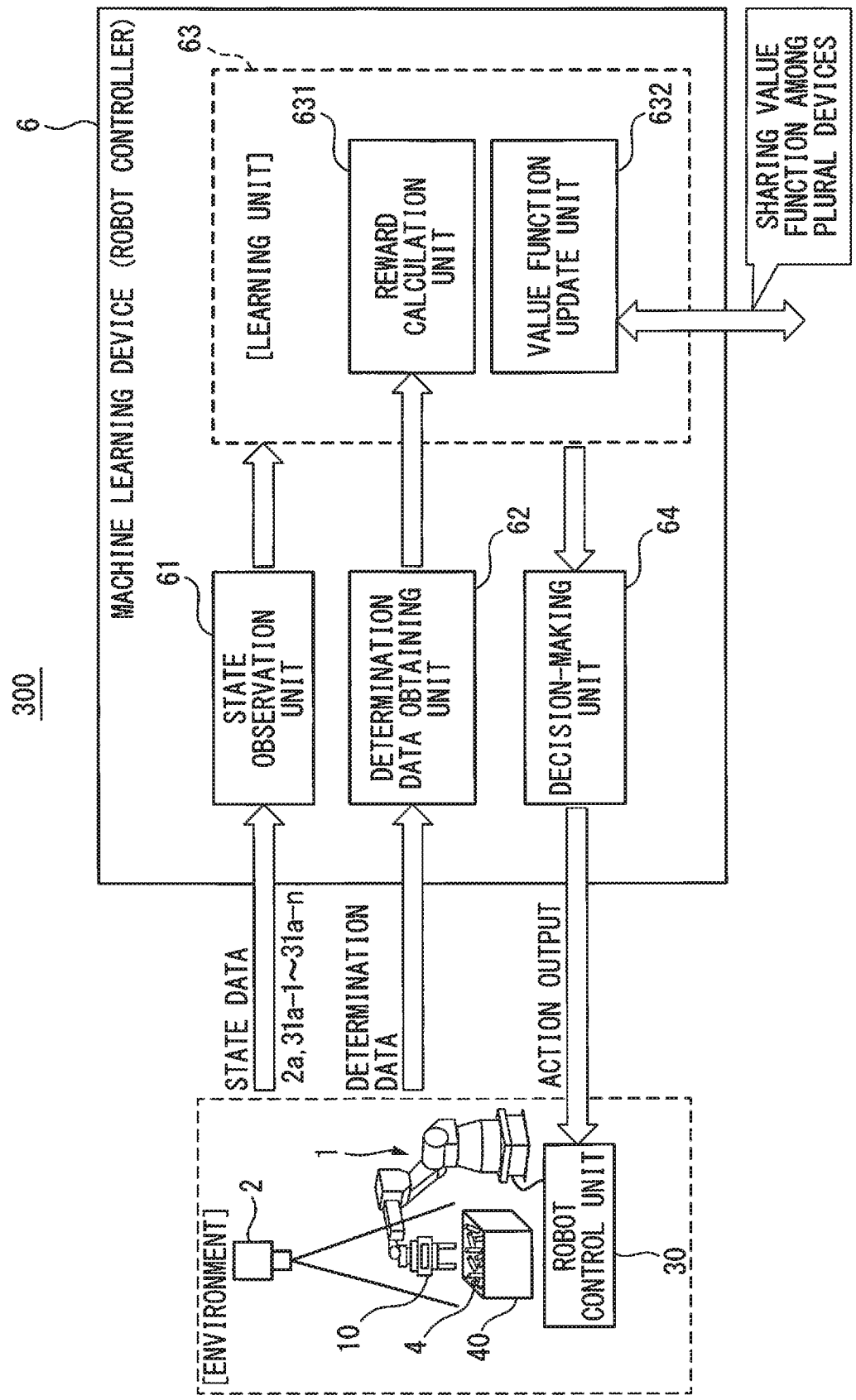
FIG. 11 is a block diagram illustrating the workpiece picking device according to the third embodiment.

FIG. 11 is a block diagram illustrating the workpiece picking device 300 according to the third embodiment and corresponds to that in which as operation determination unit 4, the machine learning device 6 is employed. Note that the machine learning device (first machine learning device) 6 in the workpiece picking device 300 according to the third embodiment is to correspond to the machine learning device (second machine learning device) 5 in the workpiece picking device 200 according to the second embodiment as described with reference to FIG. 6 and, for example, similarly as described with reference to FIG. 7, FIG. 8 and so on, may be configured, for example, by a neural network and may be realized by adopting GPGPU, large-scale PC clusters or the like. Further, similarly to the second embodiment, with respect to operation determination for determining one operation from at least one operation candidate as learned by the machine learning device 6, data may be mutually shared or exchanged in the plurality of corresponding machine learning devices (6) via a communication media. In addition, for example, the machine learning device 6 may be also incorporated in the robot control unit 30 and the robot controller 3 (unillustrated) including the holding position posture calculation units 31-1 to 31-n and the like, but may be also provided as an exclusive device separately from the robot controller 3.

As illustrated in FIG. 11, the machine learning device 6 includes a state observation unit (first state observation unit) 61, a determination data obtaining unit (first determination data obtaining unit) 62, a learning unit (first learning unit) 63, and a decision-making unit 64. The state observation unit 61 observes as state data the measurement data 2a of each of the workpieces 4 based on an output of the sensor 2, holding position posture data 31a-1 to 31a-n based on an output of at least one holding position posture calculation unit 31-1 to 31-n, and loading state improvement operation data 32a-1 to 32a-m based on an output of at least one loading state improvement operation generation unit 32-1 to 32-m. Further, the determination data obtaining unit 62 obtains as determination data, for example, time data relative to handling (handling operation) of the workpieces 4 by the robot 1. Then, the learning unit 63, for example, receives an output from the state observation unit 61 and an output from the determination data obtaining unit 62 and learns an operation of improving a loading state of the workpieces 4.

The first learning unit 63 includes a reward calculation unit (first reward calculation unit) 631 which calculates a reward on the basis of the time data relative to handling of the workpieces 4 which is an output of the determination data obtaining unit 62 and a value function update unit (first value function update unit) 632 which has a value function for determining a value of operation determination for determining one operation from at least one operation candidate and updates the value function in accordance with the reward. The reward calculation unit 631, for example, sets a positive reward when an average cycle time in which times required for handling of one workpiece 4 are averaged is short and sets a negative reward when the average cycle time is long (first reward setting). Further, the reward calculation unit 631, for example, sets a positive reward when a dispersion cycle time which indicates a dispersion of times required for handling of one workpiece 4 is short and sets a negative reward when the dispersion cycle time is long (second reward setting). Note that the reward calculation unit 631 may perform both the first reward setting and the second reward setting but may perform either thereof. Note that in the workpiece picking device 300 according to the third embodiment, the loading state improvement operation generation unit 32-1 to 32-m may be also configured in such a manner as to employ the machine learning device 5 as in the second embodiment as described above to generate the loading state improvement operation data 32a-1 to 32a-m.

Figure 12:
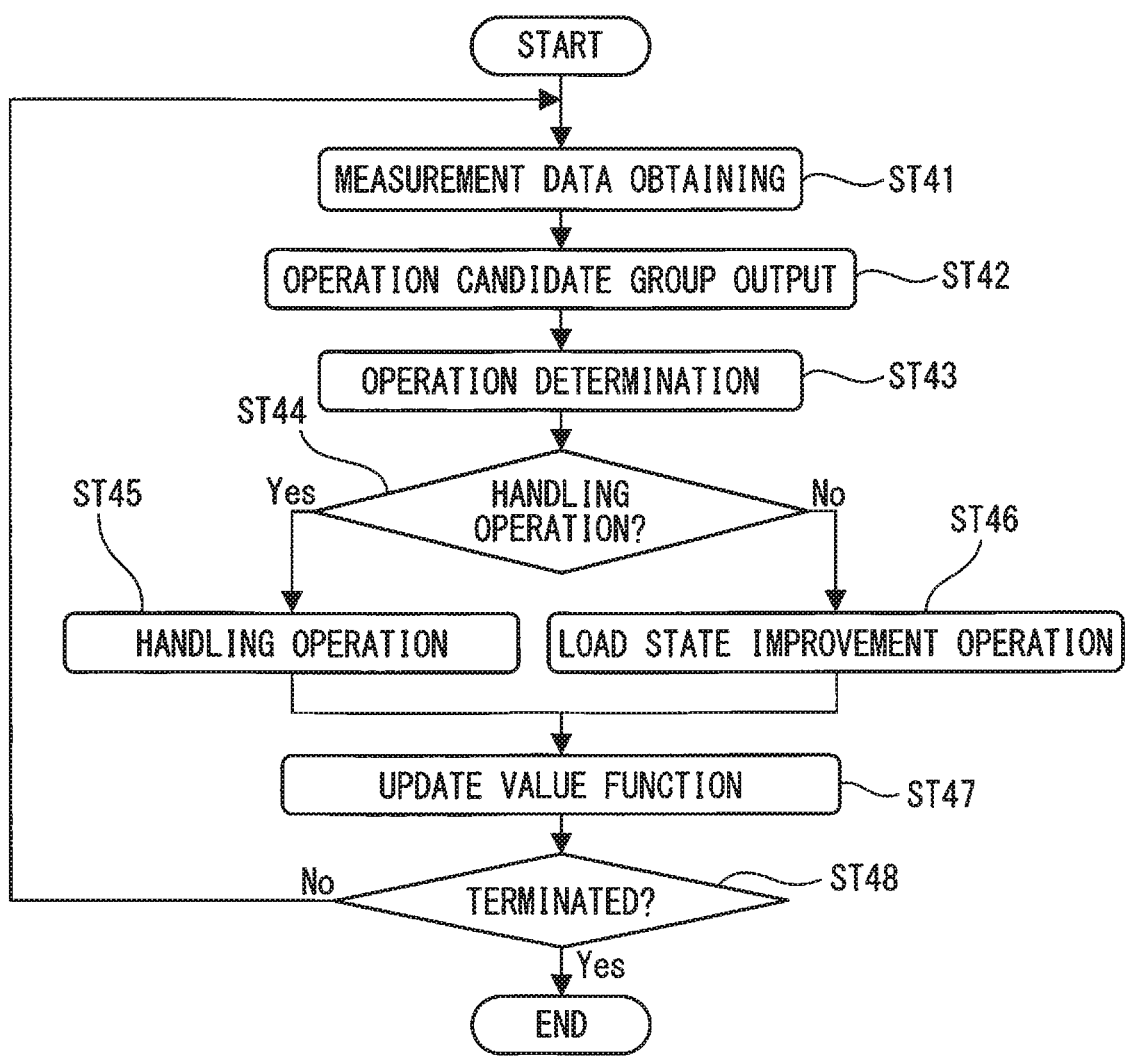
FIG. 12 is a flowchart (No. 1) for illustrating an example of workpiece picking processing of the workpiece picking device according to the third embodiment.
Figure 13:
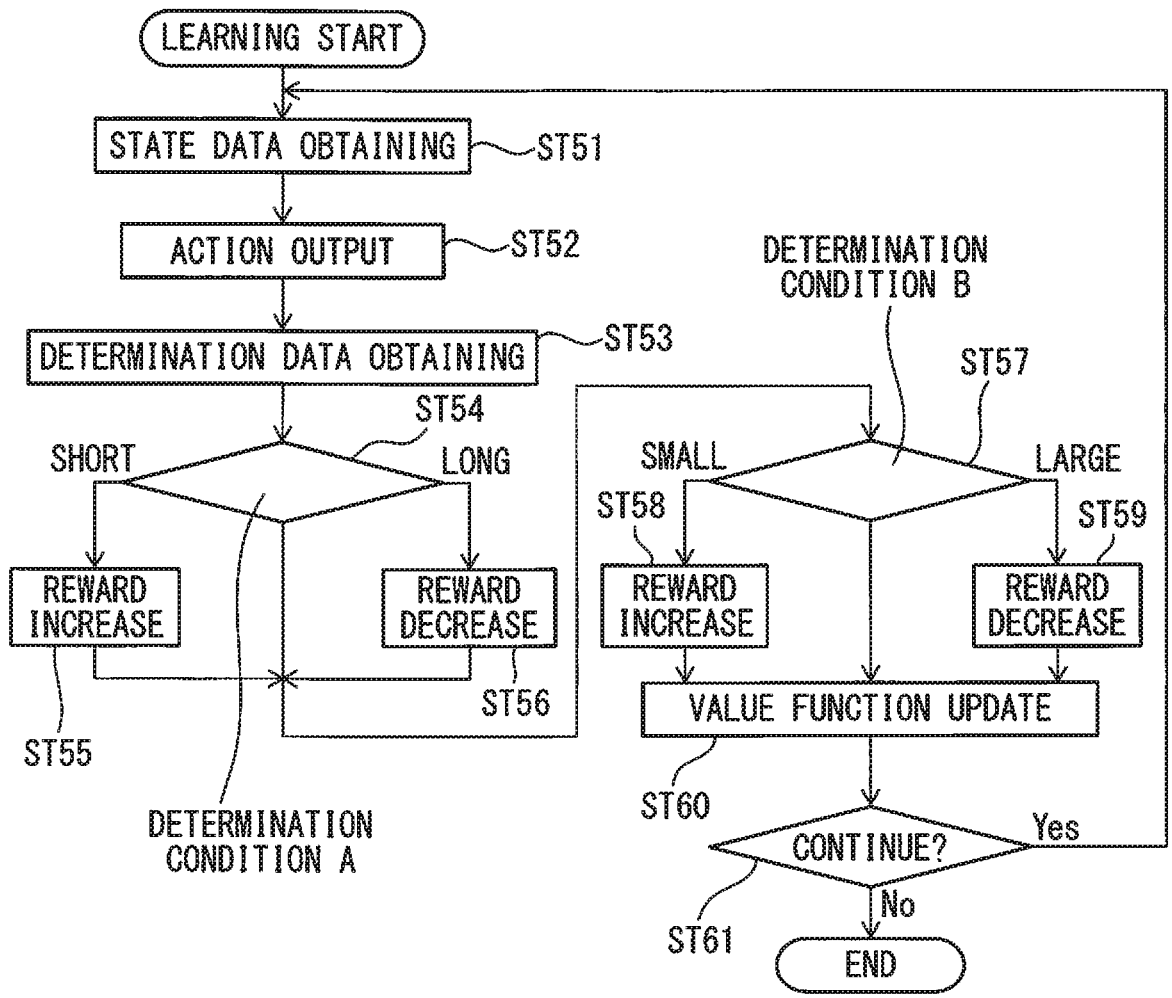
FIG. 13 is a flowchart (No. 2) for illustrating an example of workpiece picking processing of the workpiece picking device according to the third embodiment.

FIG. 12 and FIG. 13 are flowcharts for illustrating an example of workpiece picking processing of the workpiece picking device 300 according to the third embodiment: FIG.

12 is to illustrate a total processing flow; and FIG. 13 is to illustrate operation determination processing of machine learning (reinforcement learning).

First, as illustrated in FIG. 12, when an example of the workpiece picking processing of the workpiece picking device 300 according to the third embodiment starts, at step ST41, the measurement data 2a based on an output of the sensor 2 is obtained, the process advances to step ST42 and one or more (at least one) holding position posture candidate and one or more loading state improvement operation candidate (operation candidate group) are outputted, and the process advances to step ST43. At step ST43, for example, it is determined which operation is determined from a plurality of holding position postures and loading state improvement operations, and the process advances to step ST44.

At step ST44, whether or not to perform a handling operation (e.g., a series of operations of picking the workpieces 4 by the robot 1 and the inner diameter chuck (hand) 10), and when it is determined to perform the handling operation (ST44: Yes), the process advances to step ST45 and the handling operation is performed, and the process advances to step ST47. Further, in step ST44, when it is determined not to perform the handling operation (ST44: No), the process advances to step ST46 and a loading state improvement operation is performed, and the process advances to step ST47.

When machine learning (reinforcement learning) is performed, in a picking operation (handling operation), for example, whether or not picking succeeds is inputted to the machine learning device 6, and in the loading state improvement operation, for example, whether or not a loading state changes is inputted to the machine learning device 6. Note that both in the handling operation and in the loading state improvement operation, for example, a total elapsed time after a system starts (the processing is started), the total number of successes of picking, the measurement data 2a, and the like are inputted to the machine learning device 6.

At step ST47, a value function of operation determination of determining one operation from at least one operation candidate is updated, and the process advances to step ST48 and for example, it is determined whether or not picking of all the workpieces is terminated, and when it is determined that picking of all the workpieces is terminated (ST48: Yes), the processing is terminated, and when it is determined that picking of all the workpieces is not terminated (ST48: No), the process returns to step ST41 and the processing similar to that as described above is repeated. As the measurement data 2a, for example, that which is learned in learning by the machine learning device 6 may be also used.

Next, as illustrated in FIG. 13, when an example of loading state improvement processing of the workpiece picking device 300 (machine learning device 6) according to the third embodiment starts, at step ST51, the state data is obtained, the process advances to step ST52 and an action output is performed, and further the process advances to step ST53. The state data obtained at step ST51 includes, for example, the measurement data 2a based on an output of the sensor 2, at least one holding position posture data 31a-1 to 31a-n based on an output of at least one holding position posture calculation unit 31-1 to 31-n, at least one loading state improvement operation data 32a-1 to 32a-m based on an output of at least one loading state improvement operation generation unit 32-1 to 32-m, and the like.

In addition, the action output at step ST52 corresponds to determining one operation from at least one operation candidate as outputted by the operation candidate unit. Further, the action output at step ST52 includes, for example, performing a picking operation or a loading state improvement operation by the robot 1 on the basis of operation determination.

At step ST53, the determination data based on the action output at step ST52 is obtained and determination according to a determination condition A of step ST54 and determination according to a determination condition B of step ST57 are performed. In other words, in the obtainment of the determination data at step ST53, for example, an average cycle time in which times required for handling of one workpiece 4 are averaged (determination condition A), and a dispersion cycle time which indicates a dispersion of times required for handling of one workpiece 4 (determination condition B) are obtained.

First, at step ST54, on the basis of the average cycle time in which times required for handling of one workpiece 4 are averaged as obtained at step ST53, for example, when it is determined that the average time becomes short, the process advances to step ST55 and a positive reward is set, and when it is determined that the average time becomes long, the process advances to step ST56 and a negative reward is set. In other words, the shorter the average cycle time is, the more the number of workpieces being capable of being processed per unit time is so that it is configured that when the average cycle time becomes short, a positive reward is set.

Further, at step ST57, on the basis of the dispersion cycle time which indicates a dispersion of times required for handling of one workpiece 4 as obtained at step ST53, for example, when it is determined that the dispersion cycle time becomes small (short), the process advances to step ST58 and a positive reward is set, and when it is determined that the dispersion cycle time becomes large (long), the process advances to step ST59 and a negative reward is set. In other words, the shorter the dispersion cycle time (dispersion of cycle times) the more stably handling may be performed at certain intervals so that it is configured that when the dispersion cycle time becomes short, a positive reward is set.

Further, the process advances to step ST60 and on the basis of the determination according to the determination condition A at step ST54 and the determination according to the determination condition B at step ST57, i.e., on the basis of a sum of rewards by steps ST55, ST56, ST58, and ST59, the value function of the operation determination is updated, and the process advances to step ST61. At step ST61, whether or not to continue operation determination processing is determined, and when it is determined to further continue the same (ST61: Yes), the process returns to step ST51 and the processing as described above is repeated, and when it is determined not to continue the same (ST61: No), the operation determination processing is terminated. Thus, the machine learning (reinforcement learning) is employed to perform the operation determination processing so that the number of workpieces difficult to be picked may be still further reduced.

Note that it is also possible that a weight is configured to be different depending on determination according to the determination condition A at step ST54 or determination according to the determination condition B at step ST57, and for example, a weight of a determination result according to the determination condition A is set to be large, thereby allowing machine learning to be performed while giving importance to the number of workpieces being capable of picked per unit time. Further, it is needless to say that the determination condition is not limited to the determination condition A at step ST54 and the determination condition B at step ST57 but may also additionally include other conditions, or may be also either the determination condition A or the determination condition B.

As described above in detail, according to each embodiment, the number of workpieces difficult to be picked may be reduced and for example, the workpieces including the last one may be picked, and as a result improvement in productivity may be aimed. In other words, the workpiece picking device and the workpiece picking method of the present invention produce effects to be capable of reducing the number of workpieces difficult to be picked.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A workpiece picking device, comprising:
   a sensor configured to measure a plurality of workpieces randomly piled in a three-dimensional space;
   a robot configured to hold the workpieces;
   a hand mounted to the robot for holding the workpieces;
   a robot controller configured to
      calculate holding position posture data of a position and a posture to hold the workpieces by the robot on the basis of an output of the sensor,
      generate loading state improvement operation data of an operation of improving a loading state of the workpieces by the robot on the basis of the output of the sensor,
      output at least one operation candidate, and
      determine one operation from the at least one operation candidate and control the robot and the hand on the basis of the operation as determined,
      wherein the robot controller is configured to control the robot and the hand on the basis of the holding position posture data and the loading state improvement operation data to pick the workpieces or perform a loading state improvement operation; and
   a processor configured to
      observe, as state data, measurement data obtained by the sensor, the holding position posture data, and the loading state improvement operation data,
      obtain, as determination data, time data relative to handling which is a series of operations of picking the workpieces by the robot and the hand, and
      perform machine learning to learn an operation determination of determining one operation from the at least one operation candidate on the basis of the state data and the determination data.

2. The workpiece picking device according to claim 1, wherein
   the robot controller is further configured to
      control the robot and the hand on the basis of the holding position posture data when workpieces holdable by the robot are present, and
      control the robot and the hand on the basis of the loading state improvement operation data when no workpieces holdable by the robot are present.

3. The workpiece picking device according to claim 1, wherein
   the processor is further configured to
      calculate a reward on the basis of the time data,
      update a value function in accordance with the reward, wherein the value function is configured to determine a value of an operation determination for determining an operation from the at least one operation candidate, and
      perform the operation determination on the basis of the value function.

4. The workpiece picking device according to claim 3 wherein
   the processor is further configured to perform at least one of:
      a first reward setting of setting a positive reward when an average cycle time in which times required for handling one workpiece are averaged is short and setting a negative reward when the average cycle time is long, and
      a second reward setting of setting a positive reward when a dispersion cycle time which indicates a dispersion of times required for handling one workpiece is short and setting a negative reward when the dispersion cycle time is long.

5. The workpiece picking device according to claim 1, wherein
   with respect to an operation determination as learned by the processor, the processor is further configured to mutually share or exchange data with other processors via a communication medium.

6. The workpiece picking device according to claim 1, wherein
   the loading state improvement operation data includes data of:
      an approach position at which the robot approaches the workpiece;
      a loading state improvement operation start position at which the robot starts an operation of improving the loading state of the workpieces; and
      a loading state improvement operation termination position at which the robot terminates the operation of improving the loading state of the workpieces.

7. The workpiece picking device according to claim 6, wherein
   the loading state improvement operation data further includes:
      a first speed data in which the robot moves from the approach position to the loading state improvement operation start position; and
      a second speed data in which the robot moves from the loading state improvement operation start position to the loading state improvement operation termination position.

8. The workpiece picking device according to claim 6, wherein
   the hand is a magnet hand or a suction hand, and
   in the loading state improvement operation, the robot controller is configured to control the robot and the hand to
      temporarily hold the workpieces at the loading state improvement operation start position, and
      release the workpieces at the loading state improvement operation termination position.

9. The workpiece picking device according to claim 1, wherein while the loading state improvement operation is being performed, a force applied to at least one of the robot and the hand is measured, and when the measured force at or greater than a prescribed force is applied to at least one of the robot and the hand during the loading state improvement operation, the loading state improvement operation is interrupted to withdraw the robot.

10. The workpiece picking device according to claim 1, wherein the loading state improvement operation is an operation of moving or falling down the workpieces by applying an external force to the workpieces by the hand or an operation performed while an appropriate external force is applied to the workpieces by applying an impedance control to the loading state improvement operation.

11. A workpiece picking device, comprising:

a sensor configured to measure a plurality of workpieces randomly piled in a three-dimensional space;

a robot configured to hold the workpieces;

a hand mounted to the robot for holding the workpieces;

a robot controller configured to calculate holding position posture data of a position and a posture to hold the workpieces by the robot on the basis of an output of the sensor, generate loading state improvement operation data of an operation of improving a loading state of the workpieces by the robot on the basis of the output of the sensor, and control the robot and the hand on the basis of the holding position posture data and the loading state improvement operation data to pick the workpieces or perform a loading state improvement operation; and a processor configured to observe, as state data, measurement data of each of the workpieces based on the output of the sensor and the holding position posture data of each of the workpieces, obtain, as determination data, whether or not the loading state changes before and after an operation of improving the loading state of the workpieces, based on the measurement data and the holding position posture data of each of the workpieces after the operation of improving the loading state of the workpieces is performed, and perform machine learning to learn, on the basis of the state data and the determination data, the operation of improving the loading state of the workpieces.

12. The workpiece picking device according to claim 11, wherein the processor is further configured to calculate a reward on the basis of whether or not the loading state changes before and after the operation of improving the loading state of the workpieces, and the holding position posture data of each of the workpieces after the operation of improving the loading state of the workpieces is performed, and update a value function in accordance with the reward, wherein the value function is configured to determine a value of the operation of improving the loading state of the workpieces, and generate the loading state improvement operation data on the basis of the value function.

13. The workpiece picking device according to claim 12, wherein the processor is further configured to perform at least one of a first reward setting of setting a positive reward when the loading state changes and setting a negative reward when the loading state does not change before and after the operation of improving the loading state of the workpieces, and a second reward setting of setting a positive reward when calculation of the holding position posture data of each of the workpieces succeeds and setting a negative reward when calculation of the holding position posture data of each of the workpieces fails after the operation of improving the loading state of the workpieces is performed.

* * * * *